United States Patent [19]

Bowen et al.

[11] Patent Number: 5,071,265
[45] Date of Patent: Dec. 10, 1991

[54] HOLLOW ROLLER BEARING ASSEMBLY FOR BOTH RADIAL AND AXIAL LOADS

[75] Inventors: Willard L. Bowen, Harwinton; Ralph S. Howe, Jr., New Britain, both of Conn.

[73] Assignee: ZRB Bearing, Inc., Harwington, Conn.

[21] Appl. No.: 639,046

[22] Filed: Jan. 9, 1991

[51] Int. Cl.$^5$ ............................................. F16C 33/34
[52] U.S. Cl. .................................... 384/567; 384/564; 384/494
[58] Field of Search ....................... 384/567, 564, 494; 29/898.062, 898.09

[56] References Cited

U.S. PATENT DOCUMENTS

| | | | |
|---|---|---|---|
| 3,410,618 | 11/1968 | Harris et al. | 384/567 |
| 3,765,071 | 10/1973 | Bowen | 29/898.062 |
| 3,930,693 | 1/1976 | Bowen | 384/567 |
| 4,002,380 | 1/1977 | Bowen | 384/567 |
| 4,232,914 | 11/1980 | Bowen, III | 384/567 |

Primary Examiner—Thomas R. Hannon
Attorney, Agent, or Firm—McCormick, Paulding & Huber

[57] ABSTRACT

A roller bearing assembly for both radial and axial loads comprises an annular series of hollow roller bearings within associated inner and outer annular bearing races. Each race has an integral and flange which projects generally radially toward the opposite race and which defines an axially inwardly facing parti-circular annular thrust surface. The flanges are arranged at axially opposite diagonal locations so that the thrust surfaces diagonally oppose each other in the axial direction. The roller bearings have parti-circular rim surfaces which engage the thrust surfaces and with the bearings preloaded both radially and axially enhanced stiffness and running accuracy is achieved, in a second form, annular recesses provide opposite end flanges on the roller bearings with enhanced axial flexibility. Bearing assemblies may be employed in axially adjacent pairs in machine tool spindles and the like.

37 Claims, 3 Drawing Sheets

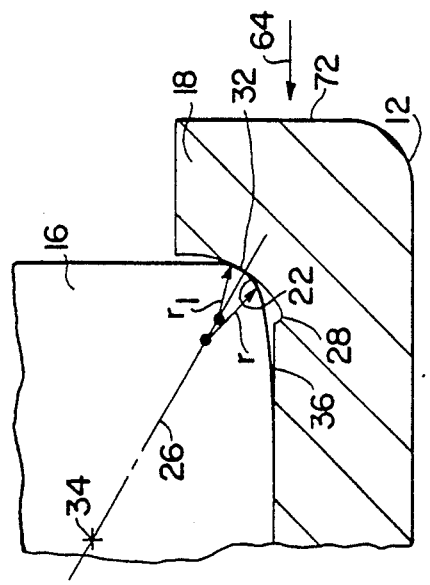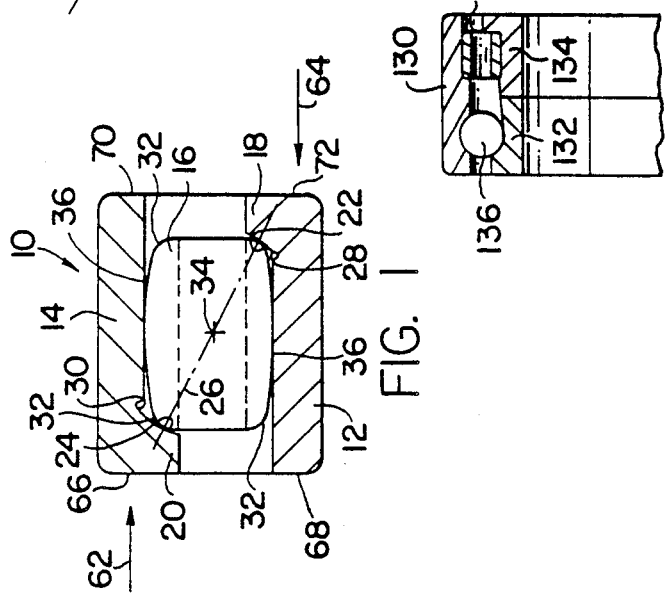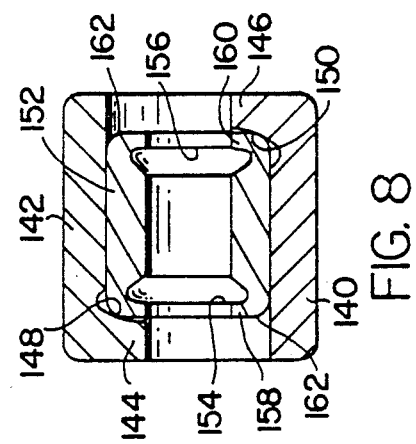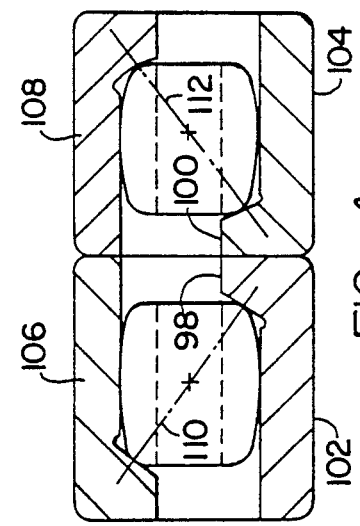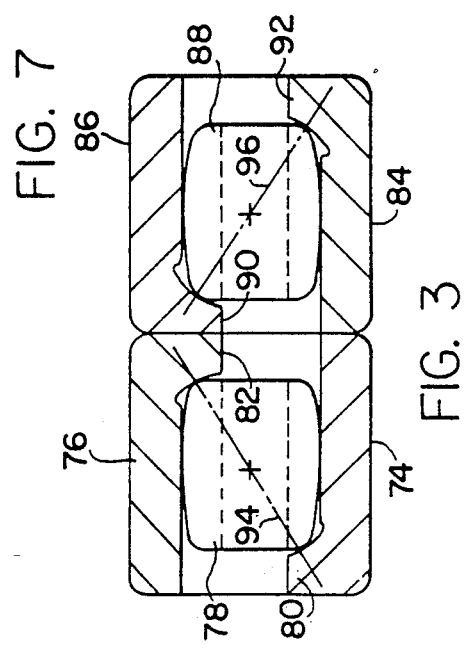

HOLLOW ROLLER BEARING ASSEMBLY FOR BOTH RADIAL AND AXIAL LOADS

BACKGROUND OF THE INVENTION

Hollow roller bearings have heretofore been employed successfully in carrying radial loads. Superior load carrying capability, stiffness and running accuracy have been achieved in relation particularly to the similar characteristics of solid roller bearings.

The following U.S. patents are indicative of the state of the art in this area:

|  | Title | Inventor |
| --- | --- | --- |
| U.S. Pat. No. 3,765,071 | Method of Forming a Roller Bearing of Superior Runout Characteristics | Willard L. Bowen |
| U.S. Pat. No. 3,930,693 | Full Complement Bearing Having Preloaded Hollow Rollers | Willard L. Bowen |
| U.S. Pat. No. 4,002,380 | Roller Bearing of Superior Runout Characteristics | Willard L. Bowen |
| U.S. Pat. No. 4,232,914 | Hollow Roller Tapered Bearing | Willard L. Bowen |

U.S. patent application entitled HOLLOW ROLLER BEARING AND METHOD OF MAKING AND MOUNTING SAME filed Dec. 11, 1990; Ser. No. 625,883, U.S. Pat. No. 5,033,877 is also relevant in disclosing an improved hollow roller bearing assembly and method, and is incorporated herein by reference.

It is the general object of the present invention to provide an improved hollow roller bearing assembly for both radial and axial loads and which exhibits superior radial and axial stiffness and running accuracy in relation to prior art bearings.

SUMMARY OF THE INVENTION

In fulfillment of the foregoing object, a hollow roller bearing assembly is provided wherein a plurality of hollow roller bearings cooperate with associated inner and outer annular bearing races. Each bearing race has at least one integral annular end flange which projects generally radially from the body of the race in a direction toward the opposite race and which defines an axially inwardly facing generally radially extending annular thrust surface. The flanges are arranged at axially opposite ends or diagonally opposite locations on the races so that the annular thrust surfaces on the flanges face toward and generally diagonally oppose each other in the axial direction. The hollow roller bearings are arranged in an annular series in assembly with and within the inner and outer races with individual bearings substantially equally preloaded throughout the series in the radial direction and also with individual bearings substantially equally preloaded generally diagonally axially throughout the annular series by engagement of the end surfaces thereof with the annular thrust surfaces on the race flanges.

Radially extending end surfaces at one end of the inner and outer bearing races preferably reside in common in a first radial plane while the radial end surfaces at an opposite end of the races reside in common in a second radial plane.

The annular thrust surfaces, in accordance with the presently preferred practice, depart at least slightly from radial planes and are inclined axially outwardly in radial progression toward the opposite bearing race. More particularly, the inclined thrust surfaces may be of substantially flat or gradually arcuate shaped viewed in cross section and, in the case of arcuate thrust surfaces, the surfaces are slightly concave viewed from an adjacent roller end or rim surface.

Each hollow roller bearing preferably has an annular corner or rim surface between its generally planar and radially extending end surface and its generally cylindrical and axially extending side surface which engages an inclined annular thrust surface and which departs at least slightly from a sharp perpendicular corner configuration and is instead inclined or rounded at least generally in conformity with the adjacent annular thrust surface. Preferably, the annular thrust surfaces and the roller rim surfaces are relatively shaped to provide for engagement therebetween with the central line of force perpendicular to the annular thrust surfaces and also perpendicular to the roller rim surfaces. More specifically, the central lines of force preferably reside along a common diagonal line which passes through the center of the roller bearing.

Preferably, the roller rim surfaces are arcuate as are the annular thrust surfaces, both viewed in cross section, and are tangent in the region of engagement therebetween. Still further, it is the presently preferred practice that both the annular thrust surfaces and the annular rim surfaces be parti-circular in cross section with the radius of curvature of the annular thrust surfaces substantially in excess of the radius of curvature of the rim surfaces. It is believed that the radius of curvature of each annular thrust surface should be 104% to 114% of the radius of curvature of the associated rim surface.

In a presently preferred form, the hollow roller bearings are generally barrel shaped viewed in cross section so that the rim surfaces thereof are displaced slightly radially inwardly from the generally cylindrical axially extending side surfaces thereof. Further, a small annular radially outwardly extending recess in the inner surface adjacent each annular end flange may be provided to enhance the axial flexibility of the flange. Similarly, a small annular radially outwardly extending recess in the inner surface of each roller bearing adjacent but spaced from each end may serve to define an annular inwardly directed end flange and thus enhance the axial flexibility of the bearing.

Roller bearing assemblies may advantageously be used in identical adjacent pairs with end flanges in engagement on inner or outer races and inner or outer races may also be constructed integrally in such arrangements.

In the use of the hollow roller bearing assemblies in a machine tool spindle or the like, a bearing assembly may be interposed between two relatively rotatable members which apply both radial and axial forces to the assembly. Preferably, a pair of identical bearing assemblies are arranged in adjacent relationship and may be advantageously employed adjacent a working end of a spindle. A further bearing assembly adapted to carry at least radial loading may also be employed adjacent a driven end of the spindle.

DESCRIPTION OF THE DRAWINGS

FIG. 1 is a somewhat schematic cross sectional view of a roller bearing assembly constructed in accordance with the present invention and including inner and outer bearing races and an associated hollow roller bearing.

FIG. 2 is a fragmentary enlarged view showing a portion of the bearing assembly of FIG. 1.

FIG. 3 is a somewhat schematic cross sectional view similar to FIG. 1 but showing a bearing assembly including a pair of inner and outer races and associated bearings in adjacent relationship with outer bearing race flanges in engagement.

FIG. 4 is a view similar to FIG. 3 but shows inner bearing race flanges in engagement.

FIG. 5 is a view similar to FIG. 4 but shows inner bearing races of integral construction.

FIG. 6 is a view similar to FIG. 3 but shows outer bearing races of integral construction.

FIG. 7 illustrates a bearing assembly which includes both hollow roller bearings and ball bearings and associated races.

FIG. 8 is a view similar to FIG. 1 but shows a roller bearing assembly which forms an alternative embodiment of the present invention.

DESCRIPTION OF PREFERRED EMBODIMENTS

Figure 9:
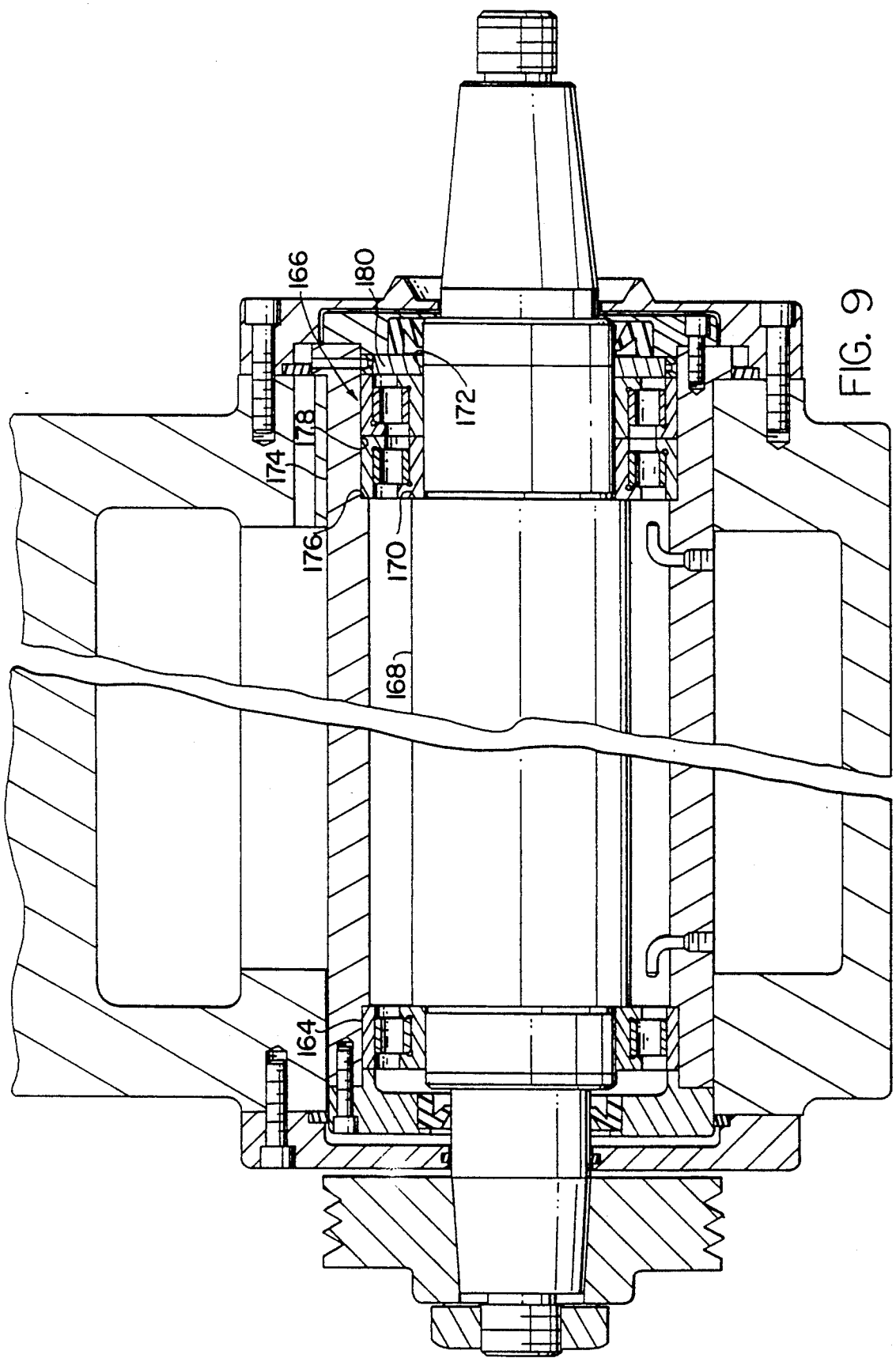
FIG. 9 shows a machine tool spindle in cross section with a roller bearing assembly of the FIG. 4 type at a working end of the spindle and a conventional radial roller bearing assembly adjacent a driven end thereof.

Referring particularly to FIGS. 1 and 2, it will be observed that a hollow roller bearing assembly indicated generally at 10 comprises inner and outer bearing races 12, 14 and an annular series of hollow roller bearings 16, one shown. The bearing races 12, 14 may be substantially conventional in form but each of said races is provided with at least one integral annular end flange as at 18, 20. The end flanges project generally radially from the body of the races in a direction toward the opposite race at axially opposite ends of the assembly and define axially inwardly facing generally radially extending annular thrust surfaces, 22, 24. The annular thrust surfaces 22, 24 face toward and generally diagonally oppose each other in the axial direction as illustrated in FIG. 1. Diagonal line 26 illustrates this relationship and will be further referred to hereinbelow.

The roller bearings 16, 16 are arranged in an annular series in assembly with and within the inner and outer races 12, 14, in a conventional manner with individual bearings substantially equally preloaded throughout the annular series in the radial direction. The condition of preloading is further discussed in the aforementioned co-pending U.S. application. Further, the individual hollow roller bearings are also substantially equally preloaded generally diagonally axially throughout the annular series by engagement of end or rim or corner surfaces thereof with the annular thrust surfaces 22, 24.

Referring particularly to FIG. 2, it will be observed that the annular thrust surface 2 does not reside precisely in a radial plane in its progression toward the outer bearing race 14. Instead, the surface is or may be said to be inclined slightly axially outwardly as it progresses radially toward the opposite race. More specifically, the thrust surface 22 is gradually arcuate viewed in cross section and slightly concave viewed from the adjacent surface of the associated roller bearing. Still further, the surface 22 is preferably parti-circular in cross section and has a radius r indicated by the small arrow so labeled. Still further, a small annular radially outwardly extending recess 28 is provided in the inner surface of the race 12 adjacent the end flange 18. The recess 28 provides for enhanced axial flexibility of the flange 18.

The thrust surface 24 may be identical to the thrust surface 22 in all respects and an annular recess 30 adjacent thereto may also be identical in both form and function with the annular recess 28.

When the axial thrust surfaces such as 22, 24 are inclined slightly axially outwardly as described, it is the preferred practice to provide each hollow roller bearing with an inclined or rounded "corner" or, more properly, "rim" surface which resides between a generally planar and radially extending end surface of the roller bearing and a generally cylindrical and axially extending side surface of the roller bearing. The "corner" or "rim" surface engages the inclined annular thrust surface and, as stated, is itself inclined at least generally in conformity with the thrust surface. More particularly, the roller rim surfaces, 32, 32 in FIGS. 1 and 2, are arcuate viewed in cross section and, still more specifically, parti-circular with a radius of curvature $r_1$ as indicated by the small arrow $r_1$ in FIG. 2. The radius of curvature of the rim surface is substantially less than the radius of curvature of the annular thrust surface 22 as will be apparent in FIG. 2. At the present time, it is believed that the radius of curvature of each end thrust surface should be in the range 104% to 114% of the radius of curvature of its associated rim surface. Further, the surfaces are tangent at the region of engagement therebetween, FIG. 2.

Reverting now to the diagonal line 26, the engagement between the annular thrust surface 22 and the bearing rim surface 32, as best illustrated in FIG. 2, is along a central line of force perpendicular to the said two surfaces. Moreover, the said central line of force of engagement is coincident with the diagonal line 26. A similar spatial or geometrical arrangement prevails at the flange 20 with its annular thrust surface 24 and the adjacent rim surface 32 of the roller bearing 16. Thus, it is to be noted that the central line of force of each region of engagement between an annular thrust surface and a bearing rim surface is preferably perpendicular to each of the surfaces and coincident with the diagonal line 26. Still further, it will be observed that the diagonal line 26 is shown passing through the center 34 of the roller bearing 16.

It should also be observed that interengagement between the rim surface and thrust surface in FIG. 2, the point at which the diagonal line 26 intersects said surfaces, is displaced from the roller bearing axis a distance less than the aggregate of the outer radius of the inner race of the roller bearing and the radius of curvature of the rim surface. Further, roller bearings such as 16, 16 are preferably generally barrel shaped viewed in cross section with rim surfaces 32, 32 displaced slightly radially inwardly from generally cylindrical side surfaces. Thus, end portions of the cylindrical side surfaces of the bearings, as at 36, taper gradually axially outwardly and radially inwardly to provide a barrel shaped configuration.

Other characteristics of the roller bearings 16, 16 may vary but should generally adhere to the characteristics of the bearings set forth in the aforementioned co-pending application. That is, characteristics such as the degree or percentage of hollowness set forth in the application should be adhered to in order to provide the desired degree of radial and axial flexibility of the roller bearings.

Preloading of the roller bearings 16, 16 will now be better understood. The aforementioned radial and axial preloading may be accomplished separately by the application of appropriate radial and axial forces to the bearings and bearing races 12, 14. It should also be observed, however, that radial preloading of the bearings can result automatically in the desired axial preloading due to the slight axial outward inclination of the thrust surfaces 22, 24. That is, as the bearings are preloaded radially between the races 12 and 14 and with the races 12 and 14 restrained against relative axial movement, the bearings will also be simultaneously preloaded axially by engagement of their rim surfaces 32, 32 with the thrust surfaces 22, 24. Properly preloaded, each and every hollow roller bearing will operate in intimate engagement with both inner and outer races in both radial and axial directions. Thus, both radial and axial loading will be shared equally among the hollow roller bearings. Both radial and axial stiffness as well as running accuracy are thus substantially enhanced.

Figure 10:
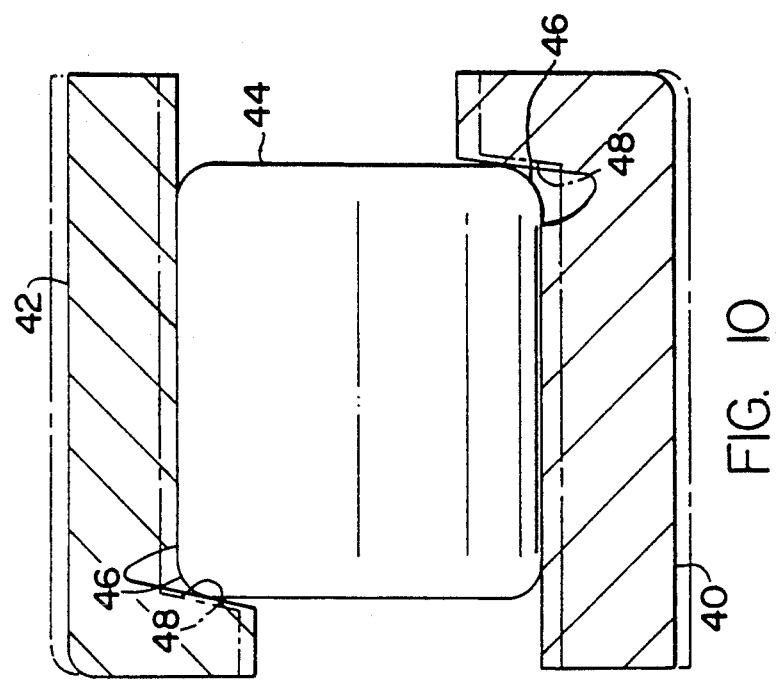
FIG. 10 is an enlarged cross sectional view of a roller bearing assembly similar to FIG. 1 but shows a solid roller bearing.

Referring particularly to FIG. 10, it will be apparent that solid roller bearings are inherently incapable of the desired overall stiffness and running accuracy achieved by the bearing assembly of the present invention. Inner and outer races 40, 42 are illustrated in operative association with a solid roller bearing 44. As is well known in the case of solid roller bearings, a shaft or housing having an interference fit designed to preload the rollers will result in excessive loading of the rollers against the race surfaces and lead to overheating and even premature failure in operation. Accordingly, a typical solid roller bearing assembly has internal clearance after interference mounting on a shaft and/or in a housing. When so mounted, a solid roller bearing under an operating radial load has approximately half or less than half of the rollers which carry the load while the remaining rollers have radial clearance with the races and carry no load whatever. This condition is illustrated in FIG. 10 wherein the roller bearing 44 engages the race but the races 40, 42 are also illustrated in broken line condition with a greater diametrical spacing or tolerance representing a conventional arrangement of non load carrying rollers. In the arrangement, the rollers remain out of engagement with the races and are incapable of sharing either radial or axial loading. Note the spaces between the roller rim surfaces 46 and the annular thrust surfaces (broken line) 48. Since it is impossible for the radial load to be shared equally among all rollers, it is equally impossible for an axial load to be shared equally among the rollers. No diagonal contact of end thrust surfaces and rollers takes place with rollers which have radial clearance with their races.

Figure 11:
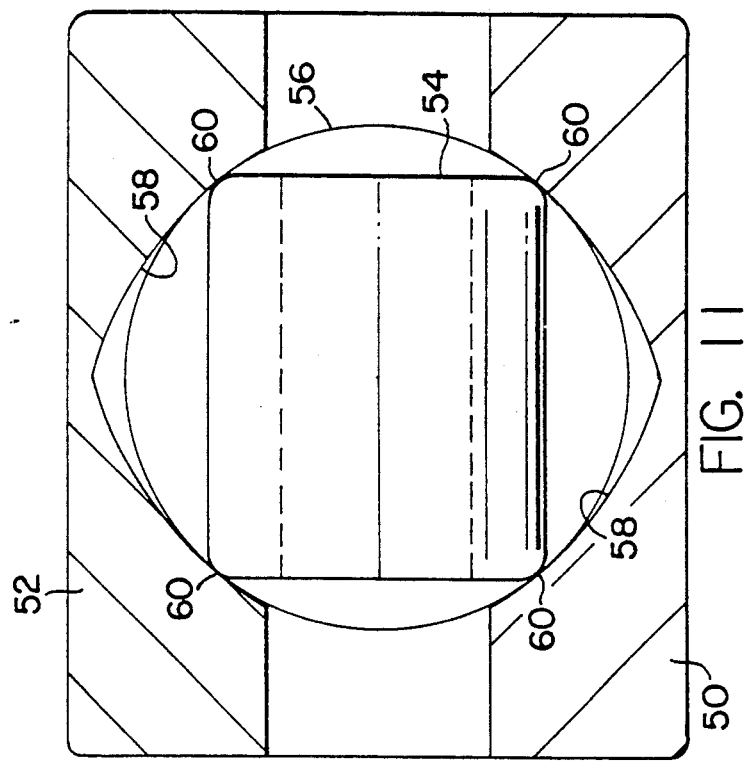
FIG. 11 is a view similar to FIG. 10 but shows a hollow roller bearing and a similarly arranged ball bearing for purposes of comparison.

In FIG. 11 inner and outer races 50, 52 have an associated hollow roller bearing 54 and ball bearing 56. The races are provided with annular recesses 58 to receive the balls and a conventional four point contact ball bearing arrangement is illustrated with contact between the ball and the races occurring at the points or regions 60, 60. As is well known, a four point contact ball bearing is capable of carrying thrust loads with a minimum of ball spin or drag due to the fact that contact occurs between the ball and the races in a tangential manner. Similarly, the roller bearing assembly of the present invention can be made to contact the annular thrust surfaces of inner and outer races so as to minimize sliding friction forces at the point or region of contact. Contact occurs very close to the external surface of the roller and sliding velocity is thus reduced to a minimum. The outer surface of the roller, as is well know, has instantaneous zero velocity with the adjacent race surface. It should also be noted that by careful arrangement of the thrust load at the tangential point of the surfaces of the roller rims and the annular thrust surfaces, it is possible to carry axial loading along the diagonal line as at 26 without introducing tipping or twisting action on the roller.

Reverting now to FIGS. 1 and 2, the direction of the application of axial loading forces to the bearings of FIGS. 1 and 2 are illustrated by arrows 62, 64. Preferably, the end faces 66, 68 and 70, 72 of the races 12, 14 are ground or otherwise machined such that the faces 66, 68 reside in common in a first radial plane and the end faces 70, 72 reside in common in a second radial plane while the bearing assembly is under a known axial load. Thus arranged and constructed, the bearing assembly of FIG. 1 can be readily assembled with a second identical bearing assembly as illustrated in FIGS. 3 and 4. In FIG. 3 inner and outer races 74, 76 have left and right hand end flanges 80, 82 respectively and an associated plurality of hollow roller bearings 78, 78, one shown. The left hand bearing assembly is arranged in side by side axially adjacent relationship with a second bearing unit or assembly having inner and outer races 84, 86, a plurality of roller bearings 88, 88, and integral end flanges 90, 92 respectively at left and right end portions of the races 84, 86. Thus, the outer race end flanges 82, 90 are in axial engagement and lines of force are arranged in opposite inclination as indicated by diagonal lines 94, 96. The diagonal lines 94, 96 intersect at the end flanges 82, 90 of the bearing races 76, 86. As will be apparent, with the bearing units of FIG. 3 arranged with their end faces in tight axial engagement and interference mounted on a shaft or in a housing, an axial internal preload can be imposed on each bearing unit whereby to produce a rigid bearing assembly in both axial and radial directions.

In FIG. 4, left and right hand bearing units are provided in substantially the same configuration as in FIG. 3 but with end flanges 98, 100 formed on inner races 102, 104 and arranged in axial engagement. Outer races 106, 108 have their end flanges arranged at axially outward end portions of the overall bearing assembly. Diagonal lines 110 and 112 intersect at the inner and engaging flanges 98, 100. Either of the FIG. 3 or FIG. 4 configuration can be advantageously employed in machine tool spindles and the like to control both radial and axial positioning of the rotating spindle.

In FIG. 5, a multiple bearing unit assembly is provided as in FIG. 4 with a two part outer bearing race 114, 116. In place of individual inner races 102, 104 of FIG. 4 however, a single integrally formed inner race 118 is provided and has a single flange 120 which is of course provided on axial opposite sides with axial thrust surfaces as in all of the foregoing bearing units. The construction of FIG. 5 enhances ease and convenience of handling and assembly of the bearings units while retaining all of the aforementioned features and advantages. It will of course be apparent that the number of manufactured parts is also reduced.

FIG. 6 discloses a bearing assembly substantially identical with the FIG. 3 assembly but which has an outer race 122 which is integrally formed with a central flange 124 as in the case of the integral flange 120 in FIG. 5. Inner races 126, 128 may be identical with those described above.

In FIG. 7 an integral outer race 130 has associated discrete inner races 132, 134. Inner race 132 in the left hand portion of the integral race 130 is adapted to receive a plurality of ball bearings as at 136 while the right hand portion of the race 130 and the inner race 134 are adapted for the accommodation of a plurality of hollow roller bearings 138, one shown. The hollow roller bearings 138, 138 and the associated race portions operate as explained above and provide a high degree of stiffness and running accuracy while the ball bearings absorb the primary axial thrust load with a minimum of friction.

In FIG. 8, a further embodiment of the present invention is illustrated with inner and outer races 140, 142 which may be identical in all respects with the races 12, 14 of FIGS. 1 and 2. End flanges 144 and 146 include annular thrust surfaces 148, 150 which are or may be identical with the thrust surfaces of the bearing assembly of FIGS. 1 and 2. Roller bearing 152, representative of a plurality of bearings operatively associated with the races 140, 142, may also be substantially identical with the hollow roller bearing 16 of FIGS. 1 and 2 except for the provision of small annular radially outwardly extending recesses in the inner surface thereof at 154 and 156. The annular recesses are adjacent but spaced from the end surfaces of the roller bearing whereby to define annular radially inwardly directed end flanges 158, 160. The end flanges 158, 160 serve to enhance the axial flexibility of the bearing and to correspondingly enhance the uniformity of load carrying cap ability of the bearings in the assembly. That is, the enhanced axial flexibility of the roller bearings tends to overcome tolerance errors or other variations in the lengths of the roller bearings and in the formation of the annular thrust surfaces on the end flanges of the races. The effect of such errors or variations is blunted at least to some degree in the FIG. 8 embodiment by the flexibility of the roller bearing end flanges. In this regard, it may be desirable to slightly modify the configurations of the annular thrust surfaces 148, 150 as well as those of rim surfaces 162, 162 on the roller bearings so as to somewhat displace the region of engagement between the thrust surfaces and rim surfaces in the radial inward direction. It is believed that this will tend to enhance the axial flexibility of the roller bearings to an even greater extent.

The bearing assemblies of the present invention may of course find application in a wide variety of rotating machinery. One particularly advantageous application of the bearing assemblies is in machine tool spindles as in FIG. 9, where such an application is illustrated. At the left hand or driven end of a machine tool spindle shown, a conventional roller bearing assembly of the type described in the aforementioned co-pending application is illustrated at 164. The bearing assembly 164 is intended to accommodate radial loading whereas bearing assembly 166 at the right hand or working end of the machine tool spindle is adapted to accommodate both radial and axial loading. The bearing assembly 166 may be identical with the bearing assembly of FIG. 3 and has associated relatively rotatable members or elements in the form of spindle 168 having an annular shoulder 170 axially engaging the left hand bearing unit in the assembly 166 and a diametrically reduced surface 172 in radial engagement with both inner races of the bearing unit. A stationary hollow cylindrical element or sleeve 174 has a shoulder 176 in axial engagement with the outer race of the left hand unit of the bearing assembly 166 and an enlarged cylindrical surface 178 radially engages both outer races of the assembly. At a right hand end portion axial engagement of the right hand bearing unit is provided for by an annular element 180. Thus, the bearing assembly 166 efficiently provides the dual function of radial and axial load accommodation.

From the foregoing it will be apparent that a relatively simple hollow roller bearing construction has been provided and yet results in a high degree of efficiency in operation. Enhanced stiffness and running accuracy is achieved in accommodating both radial and axial loads. Manufacture at economic advantage is also provided for in the simplicity of design of the hollow roller bearings and their associated races.

We claim:

1. A roller bearing assembly for both radial and axial loads comprising a plurality of hollow roller bearings and associated inner and outer annular bearing races, each bearing race having at least one integral annular end flange which projects generally radially from the body of the race in a direction toward the opposite race and which defines an axially inwardly facing generally radially extending annular thrust surface, said flanges being arranged at axially opposite diagonal locations on the races so that said annular thrust surfaces on said two flanges face toward and generally diagonally oppose each other in the axial direction, and said roller bearings being arranged in an annular series in assembly with and within said races with individual bearings substantially equally preloaded throughout the annular series in the radial direction and with individual bearings also substantially equally preloaded generally diagonally axially throughout the annular series by engagement of end surfaces thereof with said annular thrust surfaces.

2. A roller bearing assembly as set forth in claim 1 wherein said annular thrust surfaces depart at least slightly from radial planes and are inclined axially outwardly in radial progression toward the opposite race.

3. A roller bearing assembly as set forth in claim 2 wherein each hollow roller bearing has an annular rim surface between a generally planar and radial end surface and a generally cylindrical and axially extending side surface which engages an inclined annular thrust surface and which departs at least slightly from a sharp corner configuration and is instead inclined at least generally in conformity with the annular thrust surface.

4. A roller bearing assembly as set forth in claim 3 wherein the annular thrust surfaces are substantially flat viewed in cross section.

5. A roller bearing assembly as set forth in claim 3 wherein the annular thrust surfaces are gradually arcuate viewed in cross section and concave viewed from the adjacent roller bearing rim surface.

6. A roller bearing assembly as set forth in claim 3 wherein the annular thrust surfaces and the roller rim surfaces are relatively shaped to provide for engagement therebetween with a central line of force perpendicular to the annular thrust surfaces.

7. A roller bearing assembly as set forth in claim 6 wherein the annular thrust surfaces and the roller rim surfaces are relatively shaped to provide for engagement therebetween with a central line of force perpendicular to the roller rim surface.

8. A roller bearing assembly as set forth in claim 3 wherein the annular thrust surfaces and the roller rim surfaces are relatively shaped to provide for engagement therebetween with central lines of force along a common diagonal line.

9. A roller bearing assembly as set forth in claim 8 wherein each said common diagonal line passes through the center of its associated roller bearing.

10. A roller bearing assembly as set forth in claim 3 wherein both the annular thrust surfaces and the roller rim surfaces are arcuate viewed in cross section and are tangent at the region of engagement therebetween.

11. A roller bearing assembly as set forth in claim 10 wherein both the annular thrust surfaces and the roller rim surfaces are parti-circular in cross section with the radius of curvature of the annular thrust surfaces substantially in excess of the radius of curvature of the rim surfaces.

12. A roller bearing assembly as set forth in claim 11 wherein the radius of curvature of each annular thrust surface is 104% to 114% of the radius of curvature of its associated rim surface.

13. A roller bearing assembly as set forth in claim 11 wherein the region of engagement between each annular thrust surface and rim surface is displaced from the roller bearing axis a distance less than the outer radius of the inner race of the roller bearing plus the radius of curvature of the rim surface.

14. A roller bearing assembly as set forth in claim 3 wherein each roller bearing is generally barrelshaped viewed in cross section with its rim surfaces displaced slightly radially inwardly from its generally cylindrical side surfaces.

15. A roller bearing assembly as set forth in claim 3 wherein each bearing race has a small annular radially outwardly extending recess in its inner surface adjacent each annular end flange whereby to enhance the axial flexibility of the flange.

16. A roller bearing assembly as set forth in claim 3 wherein each roller bearing has a small annular radially outwardly extending recess in its inner surface adjacent but spaced from each end whereby to define an annular radially inwardly directed end flange and thus to enhance the axial flexibility of the bearing.

17. A roller bearing assembly as set forth in claim 3 wherein a second identical plurality of hollow roller bearings and associated inner and outer races are provided and arranged in side-by-side axially adjacent relationship with the first bearing and race unit and with end flanges on the two inner races in engagement.

18. A roller bearing assembly as set forth in claim 17 wherein said two inner races are integrally formed.

19. A roller bearing assembly as set forth in claim 3 wherein a second identical plurality of hollow roller bearings and associated inner and outer races are provided and arranged in side-by-side axially adjacent relationship with the first bearing and race unit and with end flanges on the two outer races in engagement.

20. A roller bearing assembly as set forth in claim 19 wherein said two outer races are integrally formed.

21. A roller bearing assembly as set forth in claim 1 wherein radially extending end surfaces at one of the bearing races reside in common in a first radial plane, and wherein radial end surfaces at an opposite end of the bearing races reside in common in a second radial plane.

22. A roller bearing assembly as set forth in claim 21 wherein a second identical plurality of hollow roller bearings and associated inner and outer races are provided and arranged in side-by-side axially adjacent relationship with the first bearing and race unit and with end flanges on the two inner races in engagement.

23. A roller bearing assembly as set forth in claim 22 wherein said two inner races are integrally formed.

24. A roller bearing assembly as set forth in claim 22 and including a machine tool spindle or the like having at least two relatively rotatable elements which apply both radial and axial forces, said two elements and said bearing assembly being operatively associated to accommodate and resist said forces.

25. A roller bearing assembly as set forth in claim 21 wherein a second identical plurality of hollow roller bearings and associated inner and outer races are provided and arranged in side-by-side axially adjacent relationship with the first bearing and race unit and with end flanges on the two outer races in engagement.

26. A roller bearing assembly as set forth in claim 25 wherein said two outer races are integrally formed.

27. A roller bearing assembly as set forth in claim 25 and including a machine tool spindle or the like having at least two relatively rotatable elements which apply both radial and axial forces, said two elements and said bearing assembly being operatively associated to accommodate and resist said forces.

28. A roller bearing assembly as set forth in claim 27 wherein said bearing assembly is arranged adjacent a working end of the spindle, and wherein a further bearing assembly adapted at least for radial loading is arranged in axially spaced relationship therewith adjacent a driven end of the spindle.

29. A roller bearing assembly as set forth in claim 21 wherein a second pair of inner and outer bearing races are provided and arranged in side-by-side axially adjacent engagement with said first inner and outer races, said second pair of races being adapted to receive a plurality of ball bearings in an annular series therebetween.

30. A roller bearing assembly as set forth in claim 29 wherein said adjacent and engaging inner races are formed integrally.

31. A roller bearing assembly as set forth in claim 29 wherein said adjacent and engaging outer races are formed integrally.

32. A roller bearing assembly as set forth in claim 1 wherein a second pair of inner and outer bearing races are provided and arranged in side-by-side axially adjacent engagement with said first inner and outer races, said second pair of races being adapted to receive a plurality of ball bearings in an annular series therebetween.

33. A roller bearing assembly as set forth in claim 1 and including a machine tool spindle or the like having at least two relatively rotatable elements which apply both radial and axial forces, said two elements and said bearing assembly being operatively associated to accommodate and resist said forces.

34. A roller bearing assembly as set forth in claim 1 wherein a second identical plurality of hollow roller bearings and associated inner and outer races are provided and arranged in side-by-side axially adjacent relationship with the first bearing and race unit and with end flanges on the two inner races in engagement.

35. A roller bearing assembly as set forth in claim 34 wherein said two inner races are integrally formed.

36. A roller bearing assembly as set forth in claim 1 wherein a second identical plurality of hollow roller bearings and associated inner and outer races are provided and arranged in side-by-side axially adjacent relationship with the first bearing and race unit and with end flanges on the two outer races in engagement.

37. A roller bearing assembly as set forth in claim 36 wherein said two outer races are integrally formed.

* * * * *